(12) United States Patent
Yamada et al.

(10) Patent No.: US 9,699,341 B2
(45) Date of Patent: Jul. 4, 2017

(54) IMAGE READING APPARATUS AND IMAGE READING METHOD

(71) Applicant: FUJI XEROX CO., LTD., Tokyo (JP)

(72) Inventors: Kenji Yamada, Kanagawa (JP);
Kosuke Shimizu, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/058,217

(22) Filed: Mar. 2, 2016

(65) Prior Publication Data

US 2017/0013151 A1  Jan. 12, 2017

(30) Foreign Application Priority Data

Jul. 10, 2015 (JP) ................. 2015-138452

(51) Int. Cl.
*G06F 15/00* (2006.01)
*H04N 1/00* (2006.01)
*H04N 1/10* (2006.01)
*H04N 1/12* (2006.01)

(52) U.S. Cl.
CPC ..... *H04N 1/00822* (2013.01); *H04N 1/00795* (2013.01); *H04N 1/10* (2013.01); *H04N 1/12* (2013.01); *H04N 2201/0094* (2013.01)

(58) Field of Classification Search
USPC ................................. 358/488, 474
See application file for complete search history.

(56) References Cited

U.S. PATENT DOCUMENTS

| 5,166,810 A | 11/1992 | Sorimachi et al. |
| 2002/0196226 A1* | 12/2002 | Tegreene ........... G02B 26/0841 345/103 |
| 2011/0194160 A1* | 8/2011 | Maki .................. H04N 1/00702 358/488 |

FOREIGN PATENT DOCUMENTS

| JP | 3-88478 A | 4/1991 |
| JP | 10-171182 A | 6/1998 |

* cited by examiner

*Primary Examiner* — Saeid Ebrahimi Dehkord
(74) *Attorney, Agent, or Firm* — Sughrue Mion, PLLC

(57) ABSTRACT

An image reading apparatus includes a reading unit that reads an original document that is located at plural locations different in a direction of a depth of field of a photodetector of a sensor module, and a fixing unit that fixes the sensor module in position such that a focal point of the photodetector is located within a difference between a minimum distance and a maximum distance from a light incident surface of the photodetector to the original document.

5 Claims, 15 Drawing Sheets

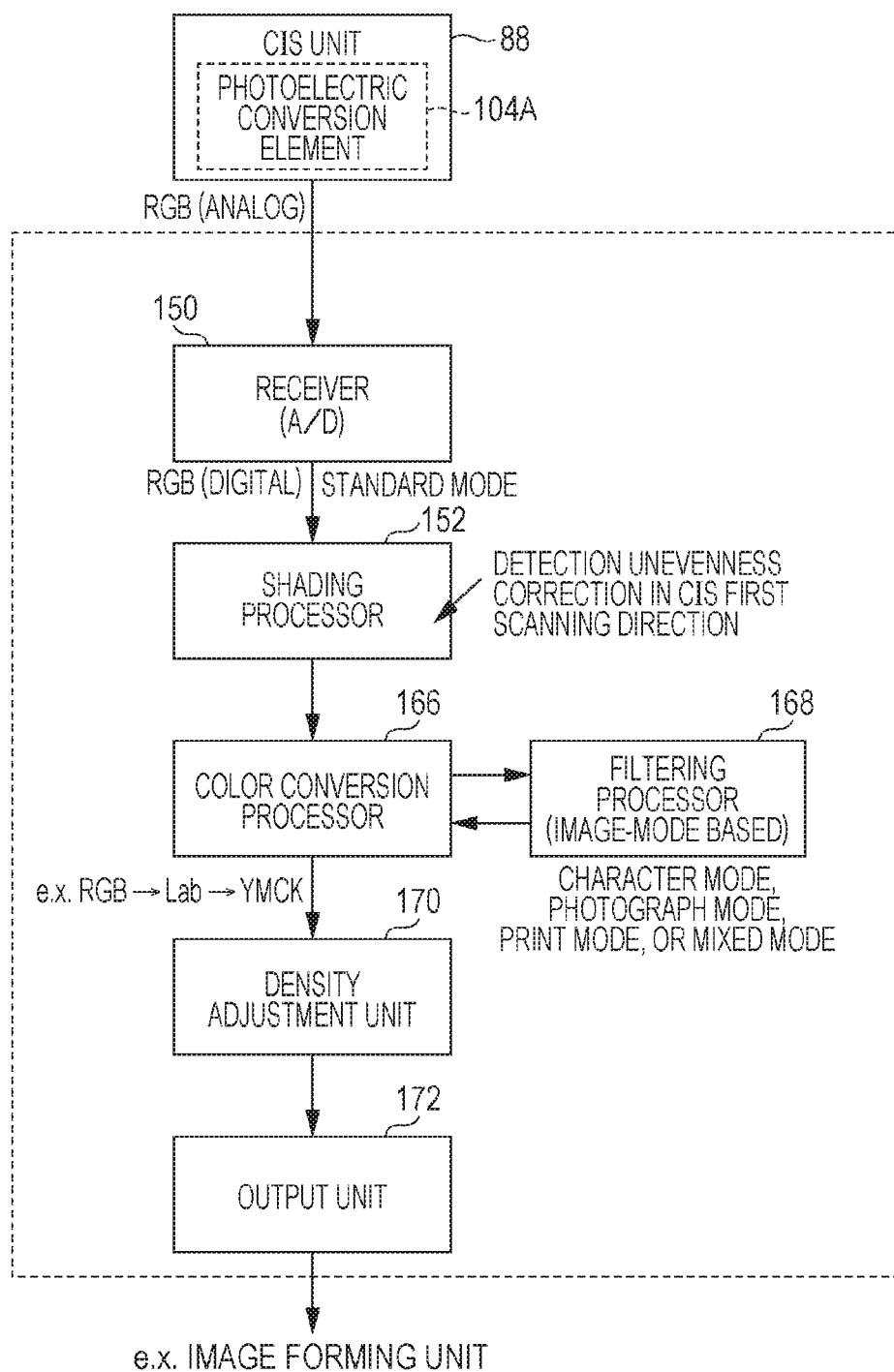

IF FOCAL POINT F IS ALIGNED WITH PLATEN SURFACE, ORIGINAL DOCUMENT IS SHIFTED FROM FOCAL POINT F BY Δ IN AUTOMATIC READING

FOCAL POINT IS SHIFTED BY Δ AS A RESULT OF LIFTING CAUSED BY FOREIGN OBJECT, BUBBLE, OR DEFORMATION

IF INTERMEDIATE LOCATION IS SET TO BE FOCAL POINT BETWEEN TWO OPTIMUM FOCAL POINTS, DEVIATION Δ/2 FROM EACH OF OPTIMUM FOCAL POINTS RESULTS

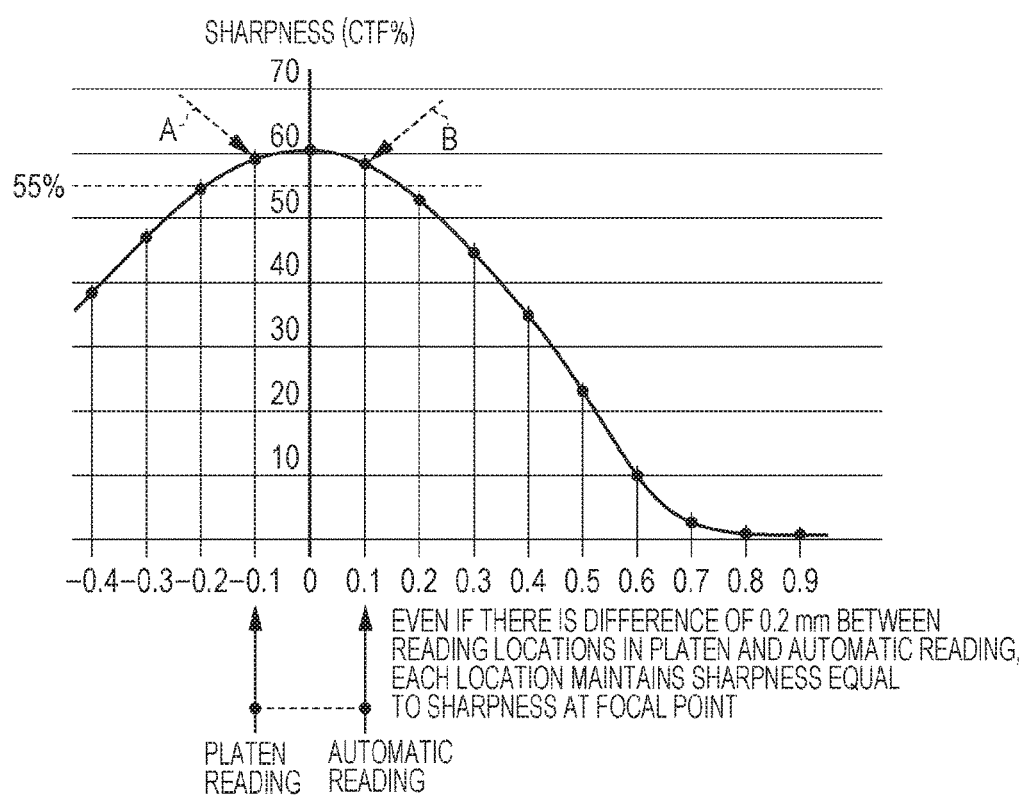

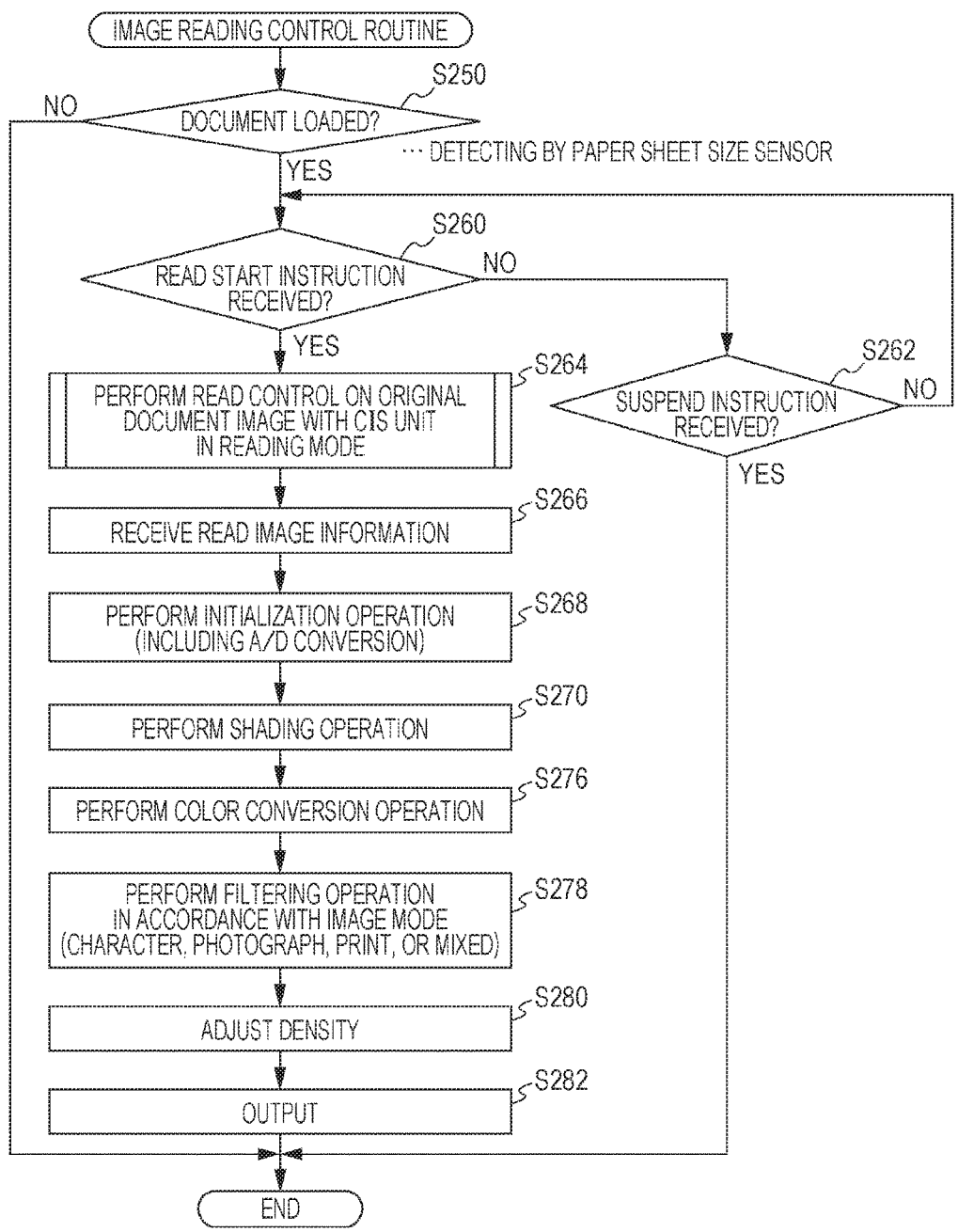

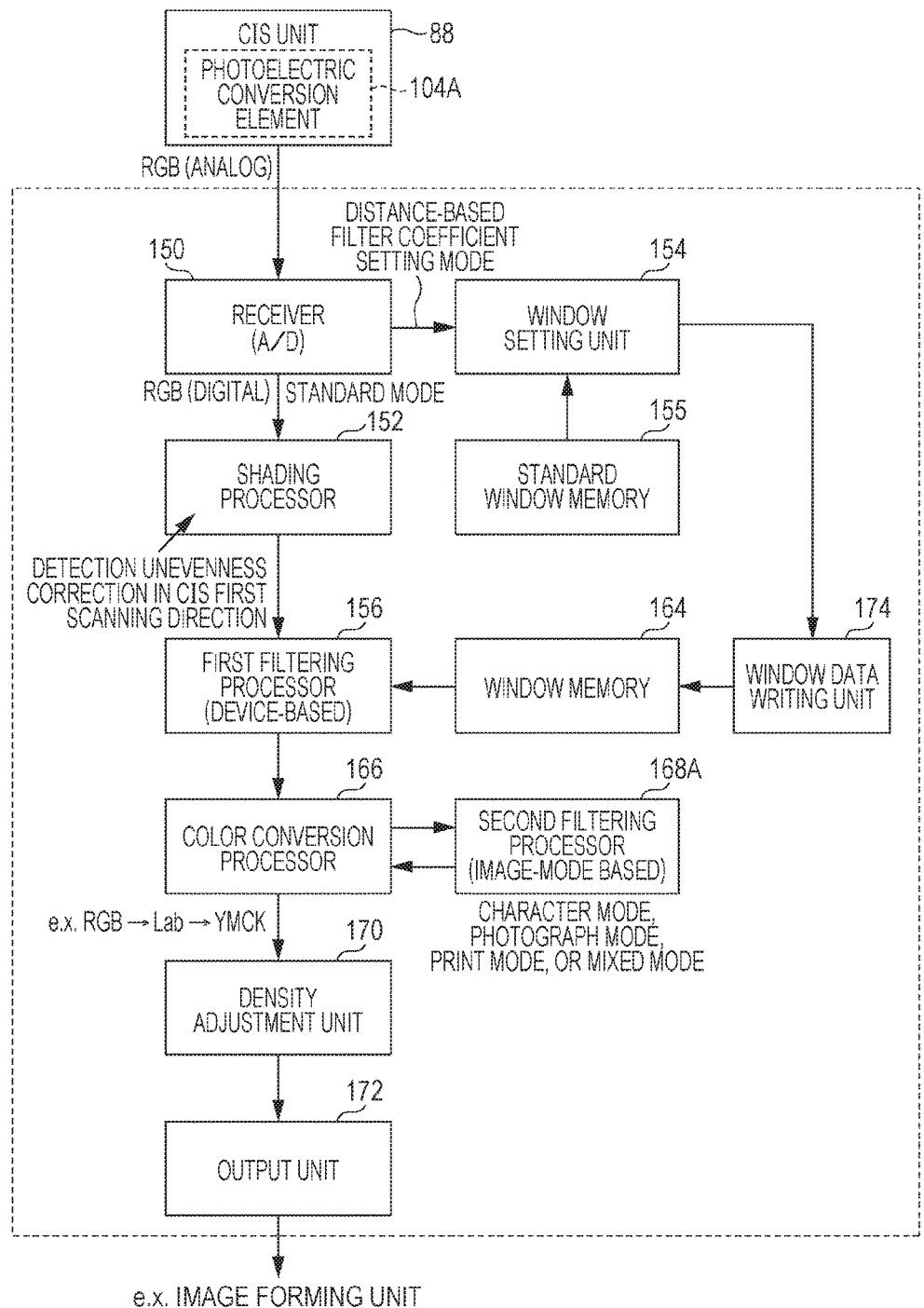

FIG. 8A

| I | H | F | H | I |
|---|---|---|---|---|
| G | E | C | E | G |
| D | B | A | B | D |
| G | E | C | E | G |
| I | H | F | H | I |

110

· IDENTICAL LETTERS REPRESENT EQUAL VALUES IN STANDARD WINDOW

FIG. 8B

| No. | VARIABLE | MEANING |
|---|---|---|
| 1 | Coef A | COEFFICIENT FOR A IN WINDOW |
| 2 | Coef B | COEFFICIENT FOR B IN WINDOW |
| 3 | Coef C | COEFFICIENT FOR C IN WINDOW |
| 4 | Coef D | COEFFICIENT FOR D IN WINDOW |
| 5 | Coef E | COEFFICIENT FOR E IN WINDOW |
| 6 | Coef F | COEFFICIENT FOR F IN WINDOW |
| 7 | Coef G | COEFFICIENT FOR G IN WINDOW |
| 8 | Coef H | COEFFICIENT FOR H IN WINDOW |
| 9 | Coef I | COEFFICIENT FOR I IN WINDOW |
| 10 | FillVal | REFERENCE VALUE OUTSIDE REGION |

| CALCULATION EXAMPLE |
|---|
| OUTPUT OF PIXEL OF INTEREST P22<br>　=P00×Coef I+P01×Coef H+P02×Coef F+P03×Coef H+P04×Coef I<br>　+P10×Coef G+P11×Coef E+P12×Coef C+P13×Coef E+P14×Coef G<br>　+P20×Coef D+P21×Coef B+P22×Coef A+P23×Coef B+P24×Coef D<br>　+P30×Coef G+P31×Coef E+P32×Coef C+P33×Coef E+P34×Coef G<br>　+P40×Coef I+P41×Coef H+P42×Coef F+P43×Coef H+P44×Coef I |
| *(UNDERLINED PORTION IS FillVal IN ABOVE EXAMPLE) |

FIG. 9A

| I | H | F | H | I |
|---|---|---|---|---|
| G | E | C | E | G |
| D | B | A | B | D |
| G | E | C | E | G |
| I | H | F | H | I |

←—110

⇩ GENERATING WINDOW SHARED BY DADF AND PLATEN

FIG. 9B

| 0.00375 | −0.0075 | −0.0675 | −0.0075 | 0.00375 |
|---|---|---|---|---|
| −0.005 | 0.01 | 0.09 | 0.01 | −0.005 |
| −0.0475 | 0.095 | 0.855 | 0.095 | −0.0475 |
| −0.005 | 0.01 | 0.09 | 0.01 | −0.005 |
| 0.00375 | −0.0075 | −0.0675 | −0.0075 | 0.00375 |

FIG. 9C

| 0.02375 | −0.0285 | −0.04 | −0.0285 | 0.02375 |
|---|---|---|---|---|
| −0.095 | 0.115 | 0.16 | 0.115 | −0.095 |
| −0.04 | 0.16 | 0.56 | 0.16 | −0.04 |
| −0.095 | 0.115 | 0.16 | 0.115 | −0.095 |
| 0.02375 | −0.0285 | −0.04 | −0.0285 | 0.02375 |

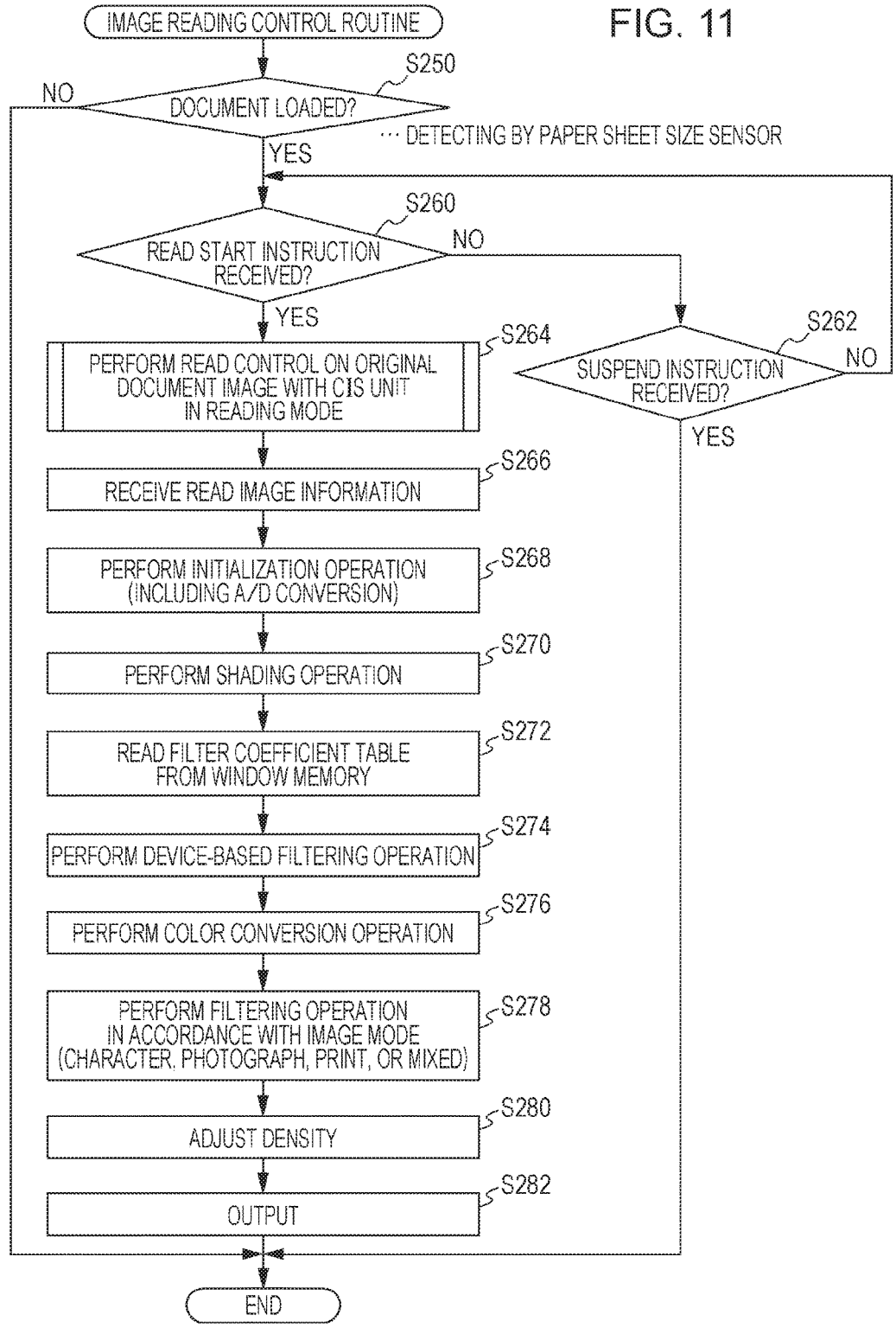

| | | OPTIMUM FOCAL DISTANCE F ALIGNED AT PLATEN AT SHIPMENT | | | | | | OPTIMUM FOCAL DISTANCE F ALIGNED IN AUTOMATIC READING AT SHIPMENT | | | | |
|---|---|---|---|---|---|---|---|---|---|---|---|---|
| PLATEN WINDOW | | 0.02375 | −0.095 | −0.04 | −0.095 | 0.02375 | | 0.02375 | −0.0285 | −0.04 | −0.0285 | 0.02375 |
| | | −0.0285 | 0.115 | 0.16 | 0.115 | −0.0285 | | −0.095 | 0.115 | 0.16 | 0.115 | −0.095 |
| | | −0.04 | 0.16 | 0.56 | 0.16 | −0.04 | WITHOUT FILTERING OPERATION | −0.04 | 0.16 | 0.56 | 0.16 | −0.04 |
| | | −0.0285 | 0.115 | 0.16 | 0.115 | −0.0285 | | −0.095 | 0.115 | 0.16 | 0.115 | −0.095 |
| | | 0.02375 | −0.095 | −0.04 | −0.095 | 0.02375 | | 0.02375 | −0.0285 | −0.04 | −0.0285 | 0.02375 |
| AUTOMATIC READING WINDOW | | 0.02375 | −0.0285 | −0.04 | −0.0285 | 0.02375 | | | | | | |
| | | −0.095 | 0.115 | 0.16 | 0.115 | −0.095 | | | | | | |
| | WITHOUT FILTERING OPERATION | −0.04 | 0.16 | 0.56 | 0.16 | −0.04 | | | | | | |
| | | −0.095 | 0.115 | 0.16 | 0.115 | −0.095 | | | | | | |
| | | 0.02375 | −0.0285 | −0.04 | −0.0285 | 0.02375 | | | | | | |

IMAGE READING APPARATUS AND IMAGE READING METHOD

CROSS-REFERENCE TO RELATED APPLICATIONS

This application is based on and claims priority under 35 USC 119 from Japanese Patent Application No. 2015-138452 filed Jul. 10, 2015.

BACKGROUND

Technical Field

The present invention relates to an image reading apparatus and an image reading method.

SUMMARY

According to an aspect of the invention, there is provided an image reading apparatus. The image reading apparatus includes a reading unit that reads an original document that is located at plural locations different in a direction of a depth of field of a photodetector of a sensor module, and a fixing unit that fixes the sensor module in position such that a focal point of the photodetector is located within a difference between a minimum distance and a maximum distance from a light incident surface of the photodetector to the original document.

BRIEF DESCRIPTION OF THE DRAWINGS

Exemplary embodiments of the present invention will be described in detail based on the following figures, wherein:

FIG. 3 is a functional block diagram of the image reading unit of the first exemplary embodiment that performs an image processing control process to process a signal;

FIGS. 4A and 4B illustrate the mounting location of the CIS unit serving as a comparative example, and FIG. 4C illustrates the mounting location of the CIS unit of the first exemplary embodiment;

FIG. 5A illustrates a distance to density chart plotted in accordance with a difference between platen reading and automatic reading.

FIG. 6 is a flowchart of an image reading control routine in accordance with the first exemplary embodiment;

FIG. 7 is a functional block diagram of the image reading unit of the first exemplary embodiment that performs an image processing control process to process a signal;

FIG. 8A illustrates a layout pattern of filter coefficients in a standard window of an edge enhancement filter of a second exemplary embodiment, FIG. 8B illustrates meanings of variables of the filter coefficients.

FIG. 9A illustrates a layout pattern of filter coefficients in an edge enhancement filter, FIG. 9B illustrates a layout pattern of numerical values of the filter coefficients of the second exemplary embodiment, and FIG. 9C illustrates a layout pattern of numerical values of the filter coefficients of a comparative example;

FIG. 11 is a flowchart of an image reading control routine in accordance with the second exemplary embodiment.

DETAILED DESCRIPTION

First Exemplary Embodiment

Figure 1:
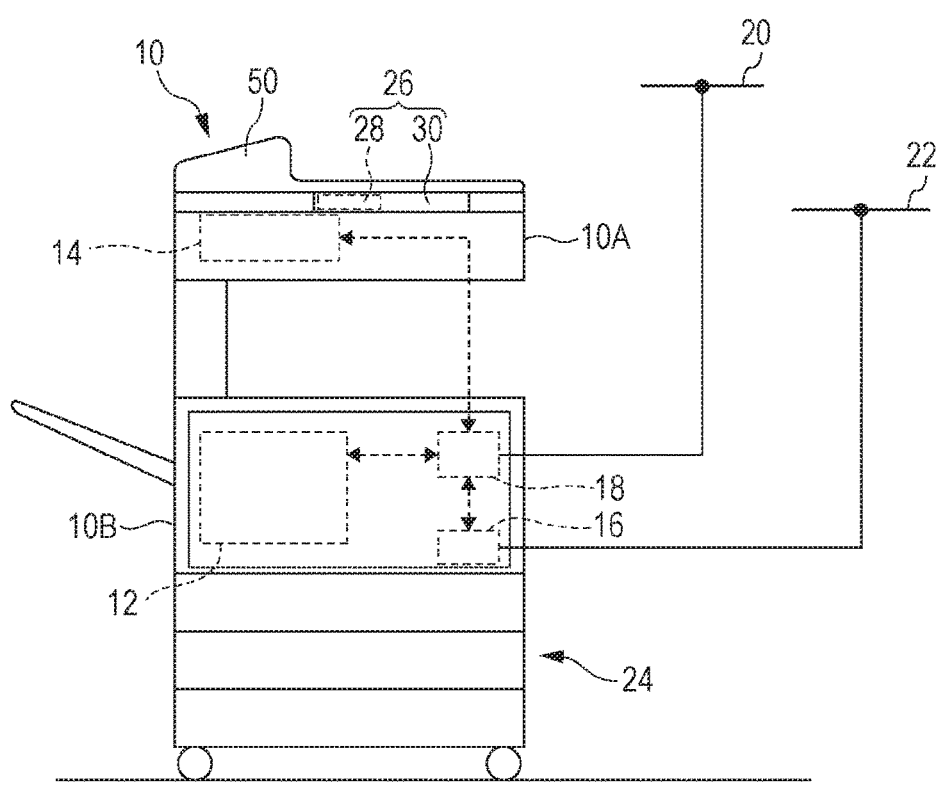
FIG. 1 generally illustrates an image processing apparatus of a first exemplary embodiment.

FIG. 1 illustrates an image processing apparatus 10 of a first exemplary embodiment.

The image processing apparatus 10 includes an image forming unit 12 that forms an image on a recording paper sheet, an image reading unit 14, and a facsimile communication controller 16.

The image processing apparatus 10, including a controller 18, controls the image forming unit 12, the image reading unit 14, and the facsimile communication controller 16. The image processing apparatus 10 may temporarily store image data of an original document image read by the image reading unit 14, and may transfer the read image data to the image forming unit 12 or the facsimile communication controller 16. The image reading unit 14 is covered with a top housing 10A. The image forming unit 12, the facsimile communication controller 16, and the controller 18 are covered with a bottom housing 10B. Plural tray units 24 containing recording paper sheets are arranged under the bottom housing 10B.

A user interface 26 (hereinafter referred to as "UI 26") is disposed in a top and front portion of the top housing 10A covering the image reading unit 14. The UI 26 may issue (service) operation commands including those for an image reading operation, a copying operation, an image forming operation, and a transmitting and receiving operation, or may display the status of the image processing apparatus 10. The UI 26 includes a touchpanel unit 28 that issues a command when a user touches a display screen with his or her finger, and a hard-key array unit 30 that includes plural hard keys (not illustrated) that are configured to issue a command in response to a mechanical action (such as a pressing action).

The controller 18 connects to a communication network 20, such as the Internet, and the facsimile communication controller 16 connects to a public telephone network 22. The controller 18 is connected to a host computer via the communication network 20, and receives image data, or receives or transmits a facsimile via the facsimile communication controller 16 and the public telephone network 22.

In accordance with the first exemplary embodiment, services (processes) including scanning, printing, facsimile transmitting, facsimile receiving, and printing subsequent to facsimile reception are performing using the image forming unit 12, the image reading unit 14, and the facsimile communication controller 16.

The image forming unit 12 includes a photoconductor drum. Arranged around the photoconductor drum are a charging unit that uniformly charges the photoconductor drum with electric charge, a scanning exposure unit that scans the charged photoconductor drum with a light beam responsive to the image data to form an electrostatic latent image, an image development unit that develops an image from the electrostatic latent image, a transfer unit that transfers the developed image on the photoconductor drum to a recording paper sheet, and a cleaning unit that cleans the surface of the photoconductor drum subsequent to the transfer operation. Also arranged along a transport path of the recording paper sheet is a fixing unit that fixes the transferred image onto the recording paper sheet.

Figure 2A:
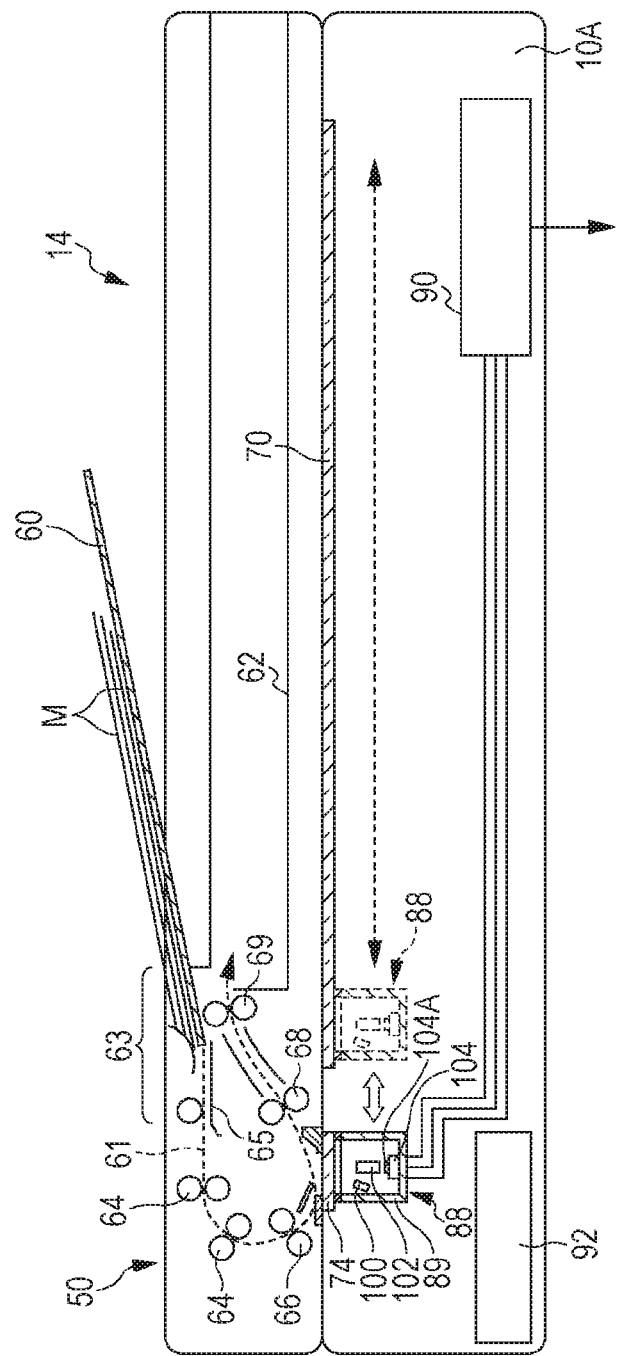
FIG. 2A is a sectional view of an image reading unit of the first exemplary embodiment.

Referring to FIG. 2A, an automatic document feeder 50 is disposed on top of the top housing 10A housing the image reading unit 14.

A platen glass 70 is disposed in the top surface of the top housing 10A, namely, the surface facing the automatic document feeder 50. A document from which an image is to be read is placed on the platen glass 70.

The automatic document feeder 50 includes a document holder 60 that receives documents, and a discharge document holder 62 into which an original document that has undergone image reading is discharged.

A document transport path 61 from the document holder 60 to the discharge document holder 62 is partially curved in an arc shape such that an original document M is turned upside down.

A paper feeder section 63 is arranged in a most upstream portion of the document transport path 61. The paper feeder section 63 picks up a sheet of the original document M placed on the document holder 60. The document transport path 61 includes plural roller pairs (a feeder roller pair 64, a timing roller pair 66, an output roller pair 68, and a discharge roller pair 69). A guide plate 65 is disposed at an appropriate location along the document transport path 61 to guide the original document M in transportation.

The feeder roller pair 64 feeds the original document at the top of the document bundle supplied from the paper feeder section 63 into the inside of the automatic document feeder 50 while turning the original document upside down.

The timing roller pair 66 adjusts a reading timing of the original document M coming in from the upstream side, and allows the original document M to pass through a facing region (reading region) of a reading window glass 74.

Figure 2B:
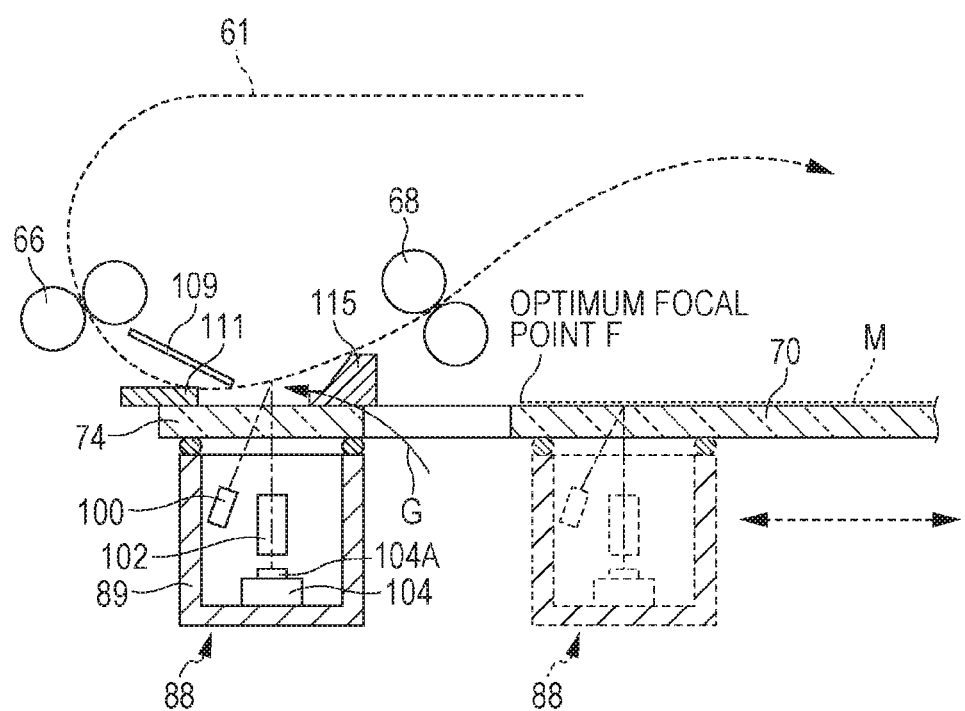
FIG. 2B illustrates an enlarged view of a reading section.

FIG. 2B illustrates the reading region of the document transport path 61 in detail.

Referring to FIG. 2B, an elastic thin film 109 is arranged above the reading window glass 74 on the upstream side of the original document M to guide the original document M toward the side of the reading window glass 74. A pad 111 is disposed on the top left end portion of the reading window glass 74 below the elastic thin film 109. The pad 111 is manufactured of a material lower in friction than the guide plate 65 having a high rigidity such that the original document M guided downward by the elastic thin film 109 moves rightward as illustrated in FIG. 2B. The original document M guided by the pad 111 passes over the reading window glass 74 with a predetermined gap G therebetween, is guided by a jump guide plate 115, and is then transported through the output roller pair 68 on the downstream side of the document transport path 61.

A contact image sensor (CIS) unit 88 serving as an example of a sensor unit is arranged below the reading window glass 74, and is ready to read the image of the original document M.

The output roller pair 68 and the discharge roller pair 69 discharge the read original document M into the discharge document holder 62.

Referring to FIG. 2A, the image reading unit 14 contained in the top housing 10A includes the CIS unit 88, a signal processor 90 that processes an image information signal read by the CIS unit 88, and a scanning controller 92 that controls the scanning operation of the CIS unit 88.

As illustrated in FIG. 2B, the CIS unit 88 is housed in a housing 89 having the longitudinal direction thereof aligned with the direction perpendicular to the page of FIG. 2B. The CIS unit 88 is configured to move along a rail mechanism (not illustrated) under the reading window glass 74 and the platen glass 70.

The CIS unit 88 is fixed at a predetermined location under the reading window glass 74 (as represented by a solid-line outlined CIS unit 88 as illustrated in FIG. 2B). The CIS unit 88 thus successively faces the surfaces of the original documents M transported along the document transport path 61. The CIS unit 88 performs a second scanning operation on the original documents M transported from the automatic document feeder 50 (hereinafter referred to as the "second scanning operation in automatic reading").

On the other hand, the CIS unit 88 reciprocates within a predetermined range under the platen glass 70. The CIS unit 88 represented by broken line in FIG. 2B indicates a home position thereof.

When the original document M is located on top of the platen glass 70, one of the reciprocal movements (inbound or outbound movement) is the second scanning operation to read the image from the original document M (hereinafter referred to as the "second scanning operation in the platen reading").

The scanning controller 92 performs control to locate the CIS unit 88 at a predetermined location below the reading window glass 74 during the second scanning operation in the automatic reading, and performs control to cause the CIS unit 88 to move at a predetermined speed under the platen glass 70 during the second scanning operation in the platen reading.

The CIS unit 88 includes a light source 100, a rod lens array 102, and a sensor printed circuit board 104 having electrophotographic conversion elements 104A mounted thereon as examples of photodetectors. The incident surface of the photoelectric conversion element 104A faces the platen glass 70 or the reading window glass 74 via the rod lens array 102.

The light source 100 illuminates the original document M, and includes light-emitting elements emitting light beams of red (R), green (G), and blue (B) wave light. The light source 100 is controlled so that the light-emitting elements successively, selectively, or concurrently light. The light beam emitted from the light source 100 is guided by an elongated light guide (not illustrated) arranged in the direction of width of the original document M (in the direction perpendicular to the page of FIG. 2B), and illuminates the original document M that is passing the reading region on the top surface of the reading window glass 74.

The rod lens array 102 includes an array of plural erection equal-magnification image forming elements respectively colinear with the elongated light guides in the longitudinal direction thereof, and focuses a light beam reflected from the original document M onto the photoelectric conversion element 104A on the sensor printed circuit board 104.

Figures 12A, 12B:
FIG. 12A illustrates a layout pattern of filter coefficients in a standard window of an edge enhancement filter.
FIG. 12B illustrates a layout pattern of numerical values of filter coefficients in accordance with a modification of the second exemplary embodiment when the mounting location of a CIS unit is modified in response to a user request.

Plural photoelectric conversion elements 104A are respectively colinearly arranged with the lenses of the rod lens array 102, and the light beam reflected from the original document M travels through the rod lens array 102 and is focused on one photoelectric conversion element 104A to another in the direction perpendicular to the page of FIG. 12B (in a first scanning operation that is commonly performed while each of the second scanning operations in the automatic reading and in the platen reading is performed).

The photoelectric conversion element 104A converts the focused reflected light beam into an electrical signal. By successively converting the reflected light beams of red, green, and blue to respective electrical signals, the first scanning operation of the color image is performed. The electrical signals are then transferred to the signal processor 90.

In the case of the first scanning operation of a monochrome image, the red, green, and blue light beams are emitted substantially concurrently and the reflected light beams are converted into electrical signals. The first scanning operation of the monochrome image thus performed, and the electrical signals are transferred to the signal processor 90. There are times when each of the red, green, and blue light beams is adjusted in terms of emission time in view of white balance.

As described below, the term "automatic reading" refers to an operation in which the image of the original document M is read while the original document M is transported from the automatic document feeder 50 and is passing along the document transport path 61 over the reading window glass 74 (in the second scanning operation in the automatic reading) as illustrated in FIG. 2B.

The term "platen reading" refers to an operation in which the image of the original document M located on the platen glass 70 is read while the CIS unit 88 is moving under the platen glass 70 (in the second scanning operation in the platen reading).

FIG. 3 is a functional block diagram of the signal processor 90 in the image reading unit 14. The function block diagram is not limited to a hardware configuration of the signal processor 90.

The photoelectric conversion element 104A in the CIS unit 88 is connected to a receiver 150, and outputs a photoelectric conversion signal (an analog electrical signal) to the receiver 150.

The receiver 150 converts an (analog) electrical signal of at least one of received RGB colors into a digital signal (in an analog-to-digital conversion), and outputs the converted digital signal to a shading processor 152 in a standard mode.

The shading processor 152 stores a correction table. The correction table is used to correct variations in the output signal from the photoelectric conversion elements 104A arranged in the first scanning direction on the CIS unit 88. More specifically, the shading processor 152 corrects to a uniform value a difference in the outputs that are caused when an original document having an equal density in the first scanning direction is read.

The shading processor 152 is connected to a color conversion processor 166.

The color conversion processor 166 receives RGB image information and converts the image information into CMYK image information for the image forming unit 12 to form an image. During the color conversion, the RGB image information is converted into CMYK image information via L*a*b* color space (RGB to CMYK via L*a*b*). The color conversion may be performed to another specified color space rather than CMYK.

The color conversion processor 166 is connected to an image-mode based filtering processor 168. The image-mode based filtering processor 168 performs a filtering operation in an image-mode based fashion. An original document may be sorted according to a character mode, a photograph mode, a print mode, or a mixed mode, and a resulting image undergoes a filtering operation appropriate therefor. The image-mode based filtering processor 168 includes a non-linear filter, for example, and removes noise or dot without destroying an edge portion. More specifically, a non-linear smoothing filer and a non-linear edge enhancement filter are used. The non-linear smoothing filter removes noise or dot while retaining an edge portion. The non-linear edge enhancement filter enhances the edge portion without enhancing noise.

The color conversion processor 166 is connected to a density adjustment unit 170. The density adjustment unit 170 uniformly corrects all pixels such that the arithmetic mean density of all pixels finally equals a predetermined gray scale value (an intermediate value, for example). The adjustment performed by the density adjustment unit 170 is not limited to this method.

The image information adjusted in density by the density adjustment unit 170 is output to the image forming unit 12 via an output unit 172, for example. Alternatively, the image information may be transmitted to the PC or server having issued the image reading instruction.

The focal length determined by the specifications and mounting states of the photoelectric conversion element 104A and the rod lens array 102 in the CIS unit 88 in the image reading unit 14 is an element affecting image reading accuracy (sharpness).

The CIS unit 88 is smaller in the depth of field than a charge-coupled device (CCD).

The depth of field refers to a range in which a document to be read still remains in focus.

In accordance with the first exemplary embodiment, the CIS unit 88 may perform platen reading to read an image. In such a case, the image is read with the original document M closely attached onto the platen glass 70. In the automatic reading, the original document M incoming over the reading window glass 74 is transported through the gap G.

The focal length of the CIS unit 88 is fixed, and the image is read with the focal length different from the automatic reading to the platen reading.

If the original document M is in focus of the CIS unit 88 in one of reading surfaces in the platen reading and the automatic reading, the original document M is out of focus in the other of the reading surfaces. A difference thus results in the image quality between the platen reading and the automatic reading.

Such an event could occur if a foreign object or a bubble enters between the original document M and the platen glass 70 or if bending or a crease occurs in the original document M (collectively referred to as a "foreign object or the like"). With the foreign object or the like, the original document M is partially lifted from the platen glass 70 during the image reading, leading to an out-of-focus state in the CIS unit 88.

In accordance with the first exemplary embodiment, the CIS unit 88 is configured to have a permissible depth of field, namely, a range within which image reading is performed at a predetermined accuracy level (sharpness) (this range is referred to as a permissible range of the depth of field). Regardless of the automatic reading or the platen reading, the CIS unit 88 is located (in the direction of height) such that the original document M falls within the permissible range of the depth of field.

Figure 4A:
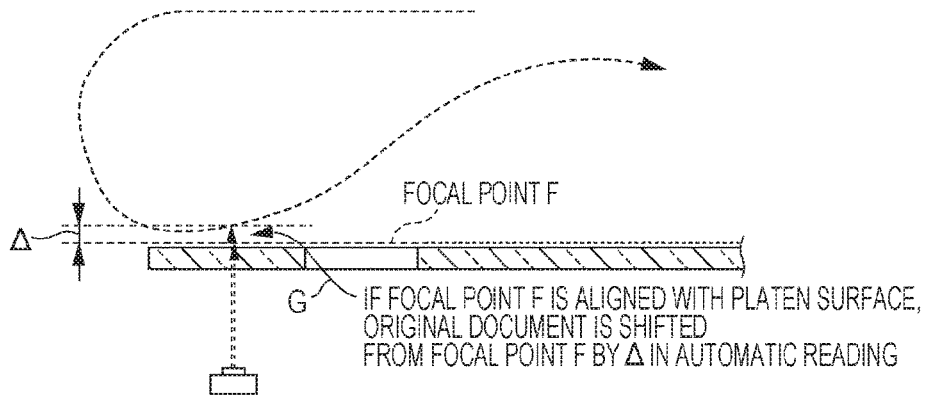
FIGS. 4A through 4C illustrate the image reading unit that indicates a relationship between a mounting location of a contact image sensor (CIS) unit a location of a focal point, more specifically.
Figure 4B:
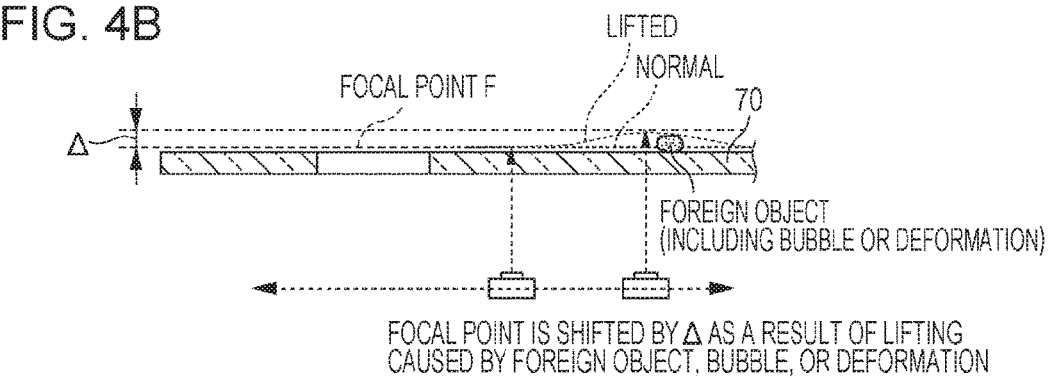
Figure 4C:
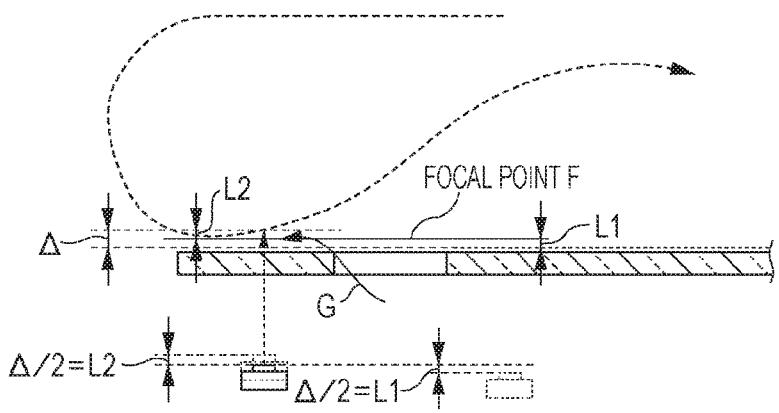

FIGS. 4A through 4C conceptually illustrate a precondition in the determination of the location of the CIS unit 88 in the first exemplary embodiment.

FIG. 4A illustrates a CIS unit 88 as a comparative example in which the original document M is out of focus in the automatic reading when a focal point F is set in the platen reading. The focal point F of the CIS unit 88 is aligned with the top surface of the reading window glass 74 (coplanar with a locating surface of the platen glass 70 on which the original document M is located).

Referring to FIG. 4A, the image is read while the original document M is scanned (transported) in the second scanning operation in the automatic reading. In this case, the gap G is present between the original document M and the reading window glass 74. Accordingly, a deviation Δ occurs of the original document M with respect to the focal length when the original document M is transported with the gap G over the reading window glass 74 in the automatic reading. The deviation Δ corresponds to the gap G, namely, 0.2 mm.

FIG. 4B illustrates a CIS unit 88 as a comparative example in which the original document M deviates from the focal point F in the platen reading when the focal point F is set in the platen reading. The focal point F of the CIS unit 88 is aligned with the top surface of the platen glass 70 (the locating surface that receives the original document M).

Referring to FIG. 4B, the original document M is placed on the top surface of the platen glass 70 in the platen reading, and the image is read while the CIS unit 88 is moved in the second scanning operation in the platen reading. If a foreign object is inserted between the original document M and the platen glass 70, the original document M may be accordingly lifted from the platen glass 70. This event may occur not only because of a foreign object, but also because of a bubble or a deformation (bending) of the original document M. These are collectively referred to as the "foreign object or the like".

With the foreign object or the like, a deviation Δ occurs with respect to the focal point F set at the top surface of the platen glass 70. The deviation Δ is based on the gap G, and the reading limit is set to be 0.2 mm.

FIG. 4C illustrates the mounting position of the CIS unit 88 in the first exemplary embodiment.

The deviation may occur with respect to the focal point F because of a difference between the automatic reading and the platen reading (see FIG. 4A), and the deviation may occur with respect to the focal point F because of the lifting of the original document M in the platen reading (see FIG. 4B). In accordance with the first exemplary embodiment, regardless of such deviations, the mounting location of the CIS unit 88 is set to be within the permissible range of the depth of field (as is described in detail below with reference to FIGS. 5A and 5B).

As illustrated in FIG. 4C, the CIS unit 88 is mounted such that the focal point F is at an intermediate position between the deviation (at half the deviation Δ).

More specifically, the CIS unit 88 is adjusted in location in view of a distance L1 from the focal point F to the location of the platen reading and a distance L2 from the focal point F to the location of the automatic reading.

In the platen reading, the original document M shifts by Δ/2 (=L1) in a negative direction with respect to the focal point F of the CIS unit 88.

In the automatic reading, the original document M shifts by Δ/2 (=L2) in a positive direction with respect to the focal point F of the CIS unit 88.

Figure 5B:
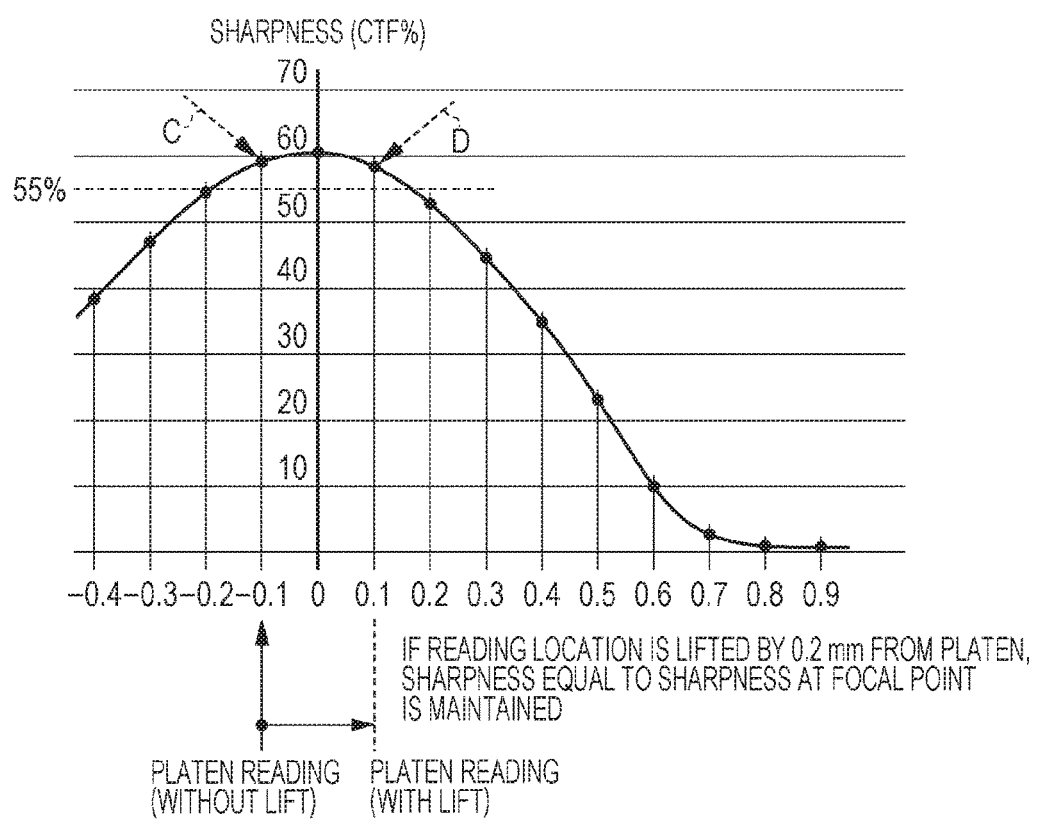
FIG. 5B illustrates a distance to density chart plotted in accordance with lifting of an original document from a platen.

FIGS. 5A and 5B illustrate characteristics charts of the relationship between resolution (CTF value) as sharpness of image and distance.

The characteristics charts are based on the premise that the original document M for distance measurement is used to measure the CTF value. The original document M for distance measurement has a measurement pattern. For example, the measurement pattern includes five pairs of black line and white line within a spacing of 1 mm with a black line alternating with a white line (5LP (5 Line-Pairs)/mm). The original document M for distance measurement having such a pattern may be used. In the case of the vertical lines, those lines may be used to measure resolution in the first scanning direction.

The image reading operation is performed using the original document M for distance measurement, and resolution is calculated in accordance with formula (1).

$$CTF \text{ value} = (\text{density of black line} - \text{density of white line})/(\text{density of black standard} - \text{density of white standard}) \times 100\% \quad (1)$$

The original document M for distance measurement may be another pattern. For example, the measurement pattern may be a square pattern of 20 mm×20 mm (white standard pattern) that is not affected by the resolution of the CIS unit 88 (see FIGS. 2A and 2B).

FIG. 5A illustrates sharpness characteristics chart obtained when the CIS unit 88 reads an image. With reference to FIG. 5A, the CTF value (see formula (1)) is plotted with respect to location in the direction of the depth of field with the focal point F (see FIG. 4C) set to be at the origin in the first exemplary embodiment.

The CTF value is 60% at maximum at the focal point F (origin) of the CIS unit 88 set in the first exemplary embodiment, and the permissible range of the depth of field with the CTF value equal to or above 55% is sufficiently satisfied.

The top surface of the platen glass 70 (the locating surface that receives the original document M) is shifted by a deviation Δ/2 (=L1) in the negative direction, but is still within the predetermined permissible range of the depth of field, namely, is equal to or above CTF value=55% or above (see an arrow mark A in FIG. 5A).

In the automatic reading on the other hand, the original document M is transported with the gap G, and is thus shifted by a deviation Δ/2 in the positive direction (see an arrow mark B in FIG. 5A). But the permissible range of depth of field with the CTF value equal to or above 55% is still satisfied.

Even if a difference of the gap G is present between the height level of the original document M in the platen reading and the height level of the original document M in the automatic reading (in the direction of depth of field) in the first exemplary embodiment, the predetermined permissible range of the depth of field of CTF value=55% or higher is ensured.

FIG. 5B illustrates sharpness characteristics chart obtained when the CIS unit 88 reads an image. With reference to FIG. 5B, the CTF value (see formula (1)) is plotted with respect to location in the direction of the depth of field with the focal point F (see FIG. 4C) set to be at the origin in the first exemplary embodiment.

The CTF value is 60% at maximum at the focal point F of the CIS unit 88 set in the first exemplary embodiment, and the permissible range of the depth of field with the CTF value equal to or above 55% is sufficiently satisfied.

The top surface of the platen glass 70 (the locating surface that receives the original document M) is shifted by a deviation Δ/2 (=L2) in the positive direction, but is still within the predetermined permissible range of depth of field, namely, is equal to or above CTF=55% or above (see an arrow mark C in FIG. 5B).

If the original document M is lifted by 0.2 mm because of the foreign object or the like, the original document M is shifted by the deviation Δ/2 in the positive direction (see an arrow mark D in FIG. 5B). But the predetermined permissible range of the depth of field of CTF=55% or higher is ensured.

In accordance with the first exemplary embodiment, the predetermined permissible range of the depth of field of CTF=55% or higher is ensured in the platen reading regardless of whether the original document M is located appropriately or lifted by the foreign object or the like.

The permissible range of the depth of field is not limited to the CTF value=55%, and may be set at a degree of sharpness permitted by the user. For example, if the permissible range of the depth of field is increased (if the CTF value is set to be less than 55%), the CTF value may fall within the permissible range of the depth of field even with a deviation of 0.2 mm. The feature of the first exemplary embodiment is that the focal point is set to be at the intermediate point between the two different reading locations. If the focal point F is set to be at the intermediate position that is at the location corresponding to half the difference between the two reading surfaces, no difference is caused in sharpness between the platen reading and the automatic reading.

The process of the first exemplary embodiment is described below.

FIG. 6 is a flowchart illustrating an image reading control routine of the first exemplary embodiment.

In step S250, the image reading unit 14 determines whether the original document M has been loaded. The image reading unit 14 performs this determination in response to a signal from a paper sheet size sensor by determining whether the original document M is loaded on the automatic document feeder 50 or on the top surface of the platen glass 70.

If the determination in step S250 is non-affirmative, the image reading unit 14 quits this routine. If the determination in step S250 is affirmative, the image reading unit 14 proceeds to step S260.

In step S260, the image reading unit 14 determines whether a read start instruction has been received. If the determination in step S260 is non-affirmative, the image reading unit 14 proceeds to step S262 to determine whether a suspend instruction has been received. If the determination in step S262 is non-affirmative, the image reading unit 14 returns to step S260. Operations in steps S260 and S262 are repeated until the determination in one of steps S260 and S262 is affirmative.

If the determination in step S262 is affirmative, the image reading unit 14 quits reading an original document, and ends this routine. If the determination in step S260 is affirmative, the image reading unit 14 proceeds to step S264. The image reading unit 14 performs image reading control on the original document using the CIS unit 88 in accordance with a reading mode (the automatic reading or the platen reading).

In the image reading control in the automatic reading, the CIS unit 88 is fixed in position under the reading window glass 74, and reads the original document M that is being transported along the document transport path 61.

In the image reading control in the platen reading, the CIS unit 88 is moved to the home position thereof under the platen glass 70, and reciprocates from the home position to read the original document M that is placed on the top surface of the platen glass 70.

In step S266, the image reading unit 14 receives the read image information (in an analog form), proceeds to step S268 to perform an initialization operation including an analog-to-digital conversion, and then proceeds to step S270 to perform a shading operation.

The image reading unit 14 performs a color conversion operation in step S276, proceeds to step S278 to perform an image-mode based filtering operation (character, photograph, print, or mixed), and then proceeds to step S280. If the image forming unit 12 is a transmission destination in the color conversion, the color conversion is performed in the order of RGB to CMYK via L*a*b*.

In step S280, the image reading unit 14 performs density adjustment, and then proceeds to step S282. The image reading unit 14 outputs the image information to the image forming unit 12.

The CIS unit 88 of the first exemplary embodiment has a shorter range of the depth of field than the CCD. For this reason, there is a possibility that a gap between the reading window glass 74 and the original document M in the automatic reading, namely, a difference between the reading surface in the platen reading and the reading surface in the automatic reading falls outside the permissible range of the depth of field (CTF value=55% or higher, for example). In particular, when one of the reading surfaces (the reading surface of the automatic reading or the reading surface of the platen reading) is set at the focal point F, the deviation Δ becomes pronounced. The deviation Δ may also occur if the original document M is lifted by the foreign object or the like in the platen reading.

In accordance with the first exemplary embodiment, the reading surface of the original document M in the automatic reading is shifted by L1 (Δ/2) with respect to the focal point F of the CIS unit 88 in the deeper direction of the depth of field (in the positive direction), and the reading surface of the original document M in the platen reading is shifted by Δ/2 (L1=L2) with respect to the focal point F of the CIS unit 88 in the shallower direction of the depth of field (in the negative direction).

The deviation from the focal point F in the automatic reading equals the deviation from the focal point F in the platen reading, in other words, L1=L2. Referring to FIG. 5A, the deviation falls within the permissible range of the depth of field in each of the automatic reading and the platen reading (for example, CTF=55% or higher), and sharpness is maintained within a predetermined allowable limit of error. Referring to FIG. 5B, the entire surface of the original document M falls within the permissible range of the depth of field (for example, the CTF value=55% or higher) even if the original document M is lifted by the foreign object or the like in the platen reading, and sharpness is maintained within the predetermined allowable limit of error.

The relationship of the permissible ranges of the depth of field of the CIS unit 88, namely, the relationship between the deviation L1 from the focal point F in the platen reading and the deviation L2 from the focal point F in the automatic reading may be L1≠L2 as long as the condition of the permissible range of the depth of field >(L1+L2) is satisfied.

Second Exemplary Embodiment

In accordance with the first exemplary embodiment, the CIS unit 88 is fixed at the location defined by the deviation L1 from the focal point F in the platen reading and the deviation L2 from the focal point F in the automatic reading. Each of the deviation L1 from the focal point F in the platen reading and the deviation L2 from the focal point F in the automatic reading falls within the permissible range of the depth of field. Predetermined desired sharpness (permissible depth of field) is thus maintained even without a correction process including a filtering operation (see FIGS. 5A and 5B).

In accordance with a second exemplary embodiment, a device-based filtering operation is performed to increase image quality (sharpness), separately from the image-mode based filtering operation. In the discussion of the second exemplary embodiment, elements identical to those of the first exemplary embodiment are designated with the same reference numerals and the discussion thereof is partially or entirely omitted.

FIG. 7 is a functional block diagram of the signal processor 90 in the image reading unit 14. The functional block diagram is not limited to the hardware configuration of the signal processor 90.

The photoelectric conversion element 104A in the CIS unit 88 is connected to the receiver 150, and transfers a photoelectric conversion signal (an electrical signal in an analog form) to the receiver 150.

The receiver 150 converts an (analog) electrical signal of at least one of received RGB colors into a digital signal (in an analog-to-digital conversion), and outputs the converted digital signal to the shading processor 152 in the standard mode.

On the other hand, in a distance-based filter coefficient setting mode, the digital electrical signal (image information) is output to a window setting unit 154. The distance-based filter coefficient setting mode is described below.

The shading processor 152 stores a correction table. The correction table is used to correct variations in the output signal from the photoelectric conversion elements 104A arranged in the first scanning direction on the CIS unit 88. More specifically, the shading processor 152 corrects to a uniform value a difference in the outputs that are caused when an original document having an equal density in the first scanning direction is read.

The shading processor 152 is connected to a first filtering processor 156. The first filtering processor 156 is used to improve degradation (such as blurriness or smear) caused as a result of a difference between a design focal point and a focal point in the actual reading operation.

The degradation caused by the difference between the focal points is corrected in an edge enhancement filtering operation.

FIGS. 8A through 8D illustrate the principle of a standard edge enhancement filtering operation.

FIG. 8A illustrates a standard filter coefficient table 110 (hereinafter also referred to as a "standard window 110"). The standard window 110 includes a matrix of five rows and five columns of cells having 25 cells. Each cell corresponds to a pixel read by the photoelectric conversion element 104A. A pixel to be filter-processed is a pixel labeled A in the center of the standard window 110 (designated A in FIG. 8A).

The cells in the standard window 110 are designated with nine different codes A through I, which represent filter coefficients.

The standard window 110 of FIG. 8A includes the codes that vertically and horizontally symmetrical. As a result, the pixels of 25 cells may be filter-processed as nine codes (nine filter coefficients).

FIG. 8B illustrates the filter coefficients of the codes. Coef (label) is a predetermined value, and is a filter coefficient corresponding to the code in the standard window 110. For example, Coef A is a predetermined value, and a filter coefficient corresponding to the code A in the standard window 110. Coef B through Coef I are filter coefficients corresponding to codes B through I.

FillVal is a pixel value that is used when the photoelectric conversion element 104A is outside the image reading region of the original document M.

Figures 8C, 8D:
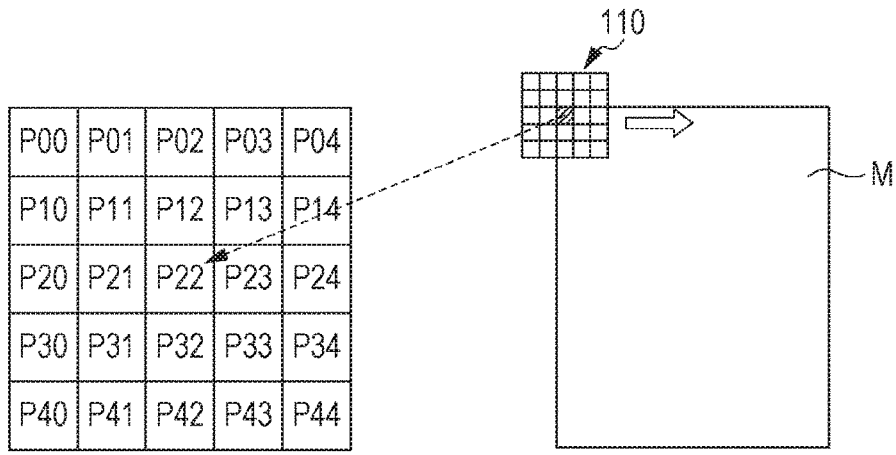
FIG. 8C is a front view of an original document identifying a pixel of interest that is filtered during image reading.
FIG. 8D illustrates a formula for a filtering process.

The right-hand figure of FIG. 8C illustrates the layout state of the standard window 110 immediately subsequent to the start of the image reading of the original document M, namely, when the scanning operations (the first scanning operation and the second scanning operation) start at the top left corner of the original document M. The photoelectric conversion element 104A reads information P in the layout state of the standard window 110 with reference to the left-hand figure of FIG. 8C. Of two digit values following the letter P, the one's digit value indicates the scanning direction of the first scanning operation and the ten's digit value indicates the scanning direction of the second scanning operation. The read information P of a total of 25 cells is identified by P00 through P04, P10 through P14, P20 through P24, P30 through P34, and P40 through P44.

When a pixel of interest (P22 in FIG. 8C) is filter-processed, a calculation of FIG. 8D is performed.

In other words, the output of the pixel of interest P22 is calculated in accordance with the following formula (2).

$$P22 = \qquad (2)$$
$$P00 \times Coef \ I + P01 \times Coef$$
$$H + P02 \times Coef \ F + P03 \times Coef \ H + P04 \times Coef \ I +$$
$$P10 \times Coef \ G + P11 \times Coef \ E + P12 \times Coef$$
$$C + P13 \times Coef \ E + P14 \times Coef \ G +$$
$$P20 \times Coef \ D + P21 \times Coef \ B + P22 \times Coef$$
$$A + P23 \times Coef \ B + P24 \times Coef \ D +$$
$$P30 \times Coef \ G + P31 \times Coef \ E + P32 \times Coef \ C + P33 \times$$
$$Coef \ E + P34 \times Coef \ G +$$
$$P40 \times Coef \ I + P41 \times Coef \ H + P42 \times Coef \ F + P43 \times Coef$$
$$H + P44 \times Coef \ I$$

In formula (2), P00 through P04, P10 through P14, P20, P21, P30, P31, P40, and P41 are outside the image reading region, and "FillVal" thus applies as the pixel value thereof. The filter coefficients in that case are identical to a coefficient that is applied when a region outside the image reading region is not included.

The first filtering processor 156 (see FIGS. 8A through 8D) of the second exemplary embodiment is based on the principle of the above filtering process. The first filtering processor 156 corrects image degradation (blurriness or smear) caused by a deviation of the reading surfaces from the optimum focal point F (see FIG. 4C).

As illustrated in FIG. 7, the first filtering processor 156 connects to a window memory 164. The window memory 164 stores a window having a matrix of common filter coefficients regardless of the reading mode (the automatic reading or the platen reading).

The window stored in the window memory 164 is generated by reading a pattern on a distance measurement original document. The generation process of the window is described below.

The first filtering processor 156 calculates the density of each pixel in accordance with formula (2) using the filter coefficients in the window stored in the window memory 164.

The image information filter-processed through the first filtering processor 156 is transferred to the color conversion processor 166. The color conversion processor 166 converts the input image information in the RGB format into the image information in the CMYK format such that the image forming unit 12 forms an image. During the color conversion, the RGB image information is converted into CMYK image information via L*a*b* color space (RGB to CMYK via L*a*b*). The color conversion may be performed to another specified color space rather than to CMYK color space.

The color conversion processor 166 is connected to a second filtering processor 168A (having the same function as the image-mode based filtering processor 168). The second filtering processor 168A performs a filtering operation in an image-mode based fashion. An original document is sorted according to a character mode, a photograph mode, a print mode, or a mixed mode, and a resulting image undergoes a filtering operation appropriate therefor. The second based filtering processor 168A includes a non-linear filter, for example, and removes noise or dot without destroying an edge portion. More specifically, a non-linear smoothing filer and a non-linear edge enhancement filter are used. The non-linear smoothing filter removes noise or dot while retaining an edge portion. The non-linear edge enhancement filter enhances the edge portion without enhancing noise.

The color conversion processor 166 connects to the density adjustment unit 170. With respect to the image information having undergone the filtering operation and the conversion operation, the density adjustment unit 170 uniformly corrects all pixels such that the arithmetic mean density of all pixels finally equals a predetermined gray scale value (an intermediate value, for example). The adjustment performed by the density adjustment unit 170 is not limited to this method.

The image information adjusted in density by the density adjustment unit 170 is output to the image forming unit 12 via the output unit 172, for example. Alternatively, the image information may be transmitted to the PC or server having issued the image reading instruction.

In accordance with the second exemplary embodiment, a common filter coefficient (window) is set to execute an optimum edge enhancement operation in the automatic reading and the platen reading which are different from each other in reading position.

The setting of the filter coefficient is performed in a distance-based filter coefficient setting mode different from the standard mode. In the distance-based filter coefficient setting mode, the information received by and analog-to-digital converted by the receiver 150 is transferred to the window setting unit 154.

A distance measurement original document M dedicated to setting the filter coefficient and having 5LP or a white standard pattern is used in the filter coefficient setting mode.

Since the deviations (L1 and L2) from the focal point F of the CIS unit 88 are equal in amount in the positive direction in the automatic reading and the negative direction in the platen reading (L1=L2) in the second exemplary embodiment, the coefficients for an edge enhancement filtering operation in the automatic reading and the platen reading are equal. More specifically, the values of the codes in FIG. 9A are equal to each other.

FIG. 9B illustrates an example of filter coefficients of the second exemplary embodiment in which the filter coefficients in the platen reading are set to be equal to the filter coefficients in the automatic reading.

FIG. 9C illustrates an example of filter coefficients of a comparative example in which the filtering operation is performed in the automatic reading with the optimum focal point set to be on the original document M in the platen reading.

The filer coefficients in FIG. 9C are larger in magnitude than the filter coefficients in FIG. 9B, in other words, provide a higher degree of edge processing correction. There are times when a higher degree of edge processing correction is not appropriate.

In comparison to FIG. 9C, FIG. 9B is based on the premise that the filtering operation is performed both in the automatic reading and the platen reading. Since the filter coefficients are smaller in magnitude in FIG. 9B, the degree of edge processing correction is reduced, leading to an appropriate correction.

The process of the second exemplary embodiment is described below.

The filter coefficient setting to set a window having the common filter coefficients assigned thereto in the automatic reading and the platen reading is described below with reference to a flowchart of FIG. 10.

Figure 10:
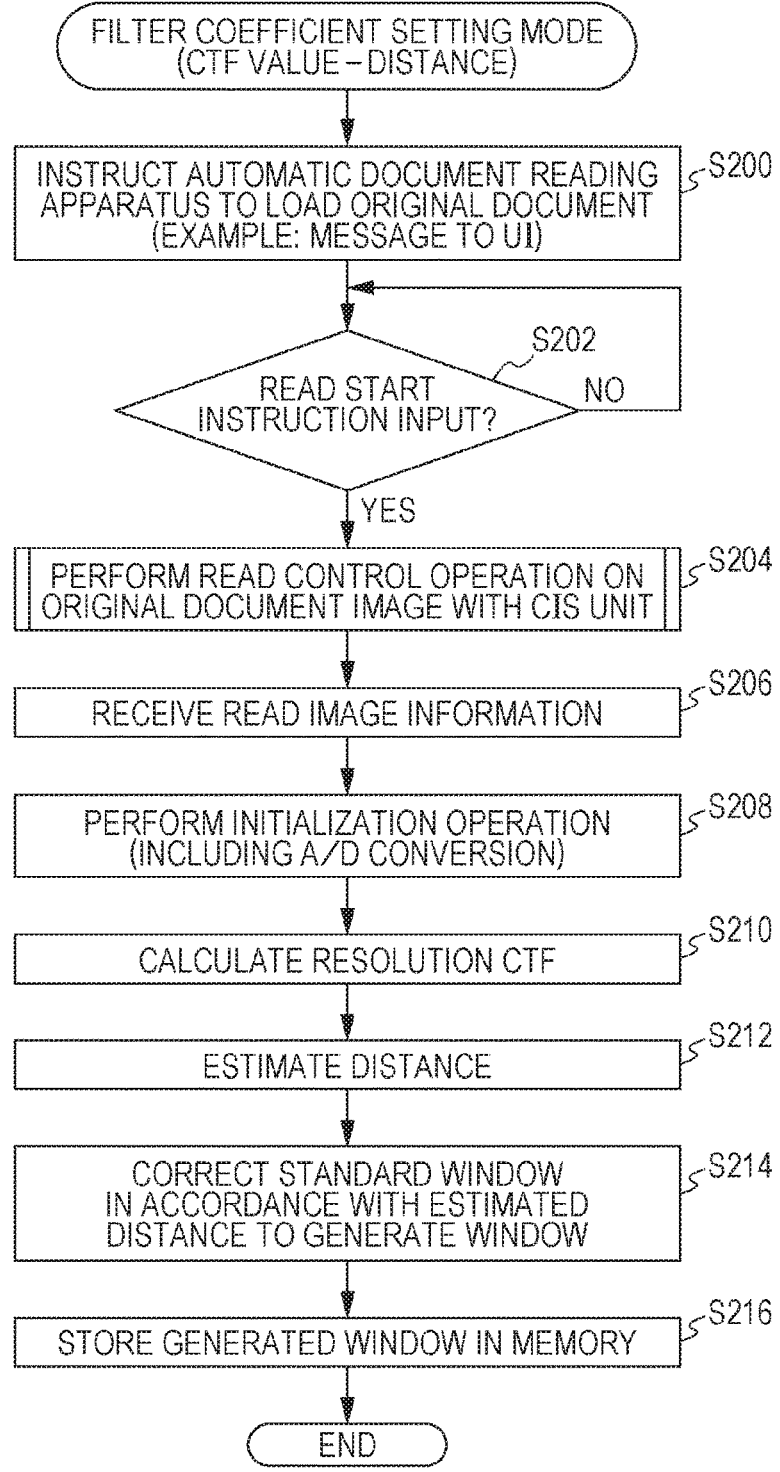
FIG. 10 is a flowchart of a filter coefficient setting mode control routine in accordance with the second exemplary embodiment.

Since the deviation L2 from the focal point F in the automatic reading and the deviation L1 from the focal point F in the platen reading are theoretically equal to each other (L1=L2), the process of the flowchart of FIG. 10 is executed with the reading mode (one of the automatic reading and the platen reading) selected, and the filter coefficients are set (simplified process).

However, since there is a possibility that the effect of difference from instrument to instrument (including a mounting location error) causes L1 and L2 to be different (L1≠L2) as illustrated in FIGS. 4A through 4C, the process of the flowchart of FIG. 8 is performed in each of the reading modes, namely, the automatic reading and the platen reading, and the results from the two processes are compared (to calculate the mean value), and then the filter coefficient for each code of the window may be set (versatile process).

In other words, if the condition L1=L2 holds, the filter coefficients set in one reading mode in the simplified process may be applied as the filter coefficients in the other reading mode. In this way, control workload is lighter than in the versatile process.

In step S200, the image reading unit 14 issues an instruction to cause the automatic document feeder 50 to load an original document M for distance measurement. For example, a message to prompt the user to load the original document M may be displayed on the UI 26.

In step S202, the image reading unit 14 determines whether a read start instruction has been input. If the determination in step S202 is affirmative, processing proceeds to step S204. In step S204, the image reading unit 14 performs read operation control to cause the CIS unit 88 to read an image in the reading mode of the automatic reading or the platen reading.

In step S206, image information (measurement pattern) read from the original document M is received. In step S208, the image reading unit 14 performs an initialization operation including an analog-to-digital conversion, and transfers the image information (in a digital form) to the window setting unit 154 (see FIG. 7).

In step S210, the image reading unit 14 analyzes the image information, and calculates the CTF value (see FIG. 5A or FIG. 5B, for example) in accordance with formula (1). Processing proceeds to step S212, and the image reading unit 14 estimates a distance from the CTF value.

In step S214, the image reading unit 14 corrects the standard window 110 in accordance with the estimated distance to generate a window. Processing proceeds to step S216. In step S216, the image reading unit 14 stores the window in the window memory 164. The routine thus ends.

In the simplified process, a filter coefficient setting operation may be performed in a periodical fashion or a non-periodical fashion subsequent to an initial setting. Since the relationship L1=L2 holds in the filter coefficient setting operation, the simplified process may be performed in any reading mode. However, the reading mode may be selected depending on a usage condition that continues until the next filter coefficient setting operation.

The frequencies of uses of the automatic reading and the platen reading may be compared, for example. The filter coefficients may be set in the reading mode having a higher frequency of uses.

The filter coefficients may be set in each of the automatic reading mode and the platen reading mode, and the resulting values may be averaged (versatile process). To perform this, the process of the flowchart of FIG. 8 may be repeated with the reading mode changed.

FIG. 11 is a flowchart of an image reading control routine of the second exemplary embodiment as a standard mode.

The image reading control in the standard mode is based on the premise that the filter coefficient setting process in the flowchart of FIG. 6 has been completed and that the window having the device-based filter coefficients has been stored in the window memory 164.

In step S250, the image reading unit 14 performs a determination as to whether the original document M has been loaded. For example, a signal from a paper sheet size sensor or the like may be used to determine whether the original document M has been loaded on the automatic document feeder 50 or on the top surface of the platen glass 70.

If the determination in step S250 is non-affirmative, the image reading control routine is terminated. If the determination in step S250 is affirmative, processing proceeds to step S260.

In step S260, the image reading unit 14 determines whether a read start instruction has been received. If the determination in step S260 is non-affirmative, processing proceeds to step S262. In step S262, the image reading unit 14 determines whether a suspend instruction has been received. If the determination in step S262 is non-affirmative, processing returns to step S260. Operations in steps S260 and S262 are repeated until an affirmative determination result is obtained in either step S260 or step S262.

If the determination in step S262 is affirmative, the original document reading quits, and this routine ends. If the determination in step S260 is affirmative, processing proceeds to step S264. The image reading control is performed to cause the CIS unit 88 to read an image in the reading mode (in the automatic reading or the platen reading).

In the image reading control in the automatic reading, the CIS unit 88 is fixed under the reading window glass 74 and reads the original document M that is being transported along the document transport path 61.

In the image reading control in the platen reading, the CIS unit 88 is moved to the home position thereof under the platen glass 70, and reciprocates from the home position to read the original document M that is placed on the top surface of the platen glass 70.

In step S266, the image reading unit 14 receives the read image information (in an analog form), proceeds to step S268 to perform the initialization operation including the analog-to-digital conversion, and then proceeds to step S270 to perform the shading operation.

In step S272, the image reading unit 14 reads the window from the window memory 164, and then performs the device-based filtering operation in step S274. Since the common window to the automatic reading and the platen reading is stored in the window memory 164, the filtering operation (edge enhancement operation) matching the respective focal length is performed.

Image quality is free from a change even if the reading mode is shifted between the automatic reading and the platen reading, and is thus free from blurriness or sear.

In step S276, the image reading unit 14 performs the color conversion. Processing proceeds to step S278. The image reading unit 14 performs the image-mode based filtering operation (character mode, photograph mode, print mode, or mixed mode), and then proceeds to step S280. If the transmission destination is the image forming unit 12, the color conversion is performed in the order of RGB, L*a*b*, and CMYK.

In step S280, the image reading unit 14 performs the density adjustment, and then proceeds to step S282. The image reading unit 14 outputs the image information to the image forming unit 12.

Modifications

In the first and second exemplary embodiments, the CIS unit 88 is mounted such that the focal point F thereof is at an intermediate location between the automatic reading surface and the platen reading surface. In the second exemplary embodiment, the common device-based window having the same filter coefficients is set in the simplified process and the versatile process.

One of the automatic reading operation and the platen reading operation may be used much more frequently than the other depending on the user. If the image processing apparatus 10 is without the automatic document feeder 50, the intermediate location setting is not needed.

Before the shipment, the mounting location of the CIS unit 88 is set for the automatic reading or the platen reading depending on the user's request or the presence or absence of the automatic document feeder 50. The distance from the CIS unit 88 to the reading surface of the original document M in one of the reading modes is thus set to be aligned with the focal point F.

The filter coefficients in the device-based window may be set as illustrated in FIGS. 12A and 12B as a step that is taken in a reading mode if the original document M is not aligned with the focal point F.

If the platen reading surface is aligned with the focal point F with respect to the standard window of FIG. 12A before the shipment, the window for the automatic reading may be generated (see the left-hand side table of FIG. 12B). On the other hand, if the automatic reading surface is aligned with the focal point F with respect to the standard window of FIG. 12A before the shipment, the window for the platen reading may be generated (see the right-hand side table of FIG. 12B).

In accordance with the exemplary embodiments, the deviation of the reading surface from the focal point F varies because of a fixed amount of lifting of the original document. The exemplary embodiments are also applicable when the deviation of the reading surface from the focal point F varies in response to a change in the thickness of the platen that occurs depending on the reading mode.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading apparatus comprising:
an image sensor comprising:
a light source; and
a photodctector;
wherein the light source is configured to transmit light to an original document that is located at a plurality of locations different in a direction of a depth of field of the photodetector,
wherein the photodetector is configured receive light reflected from the original document,
wherein the image reading apparatus further comprises a fixing unit comprising a spacer, wherein the fixing unit is configured to adjust a position of the image sensor so that the photodetector is mounted within the image reading apparatus at a position wherein a focal point of the photodetector is located between a minimum distance and a maximum distance from a light incident surface of the photodetector to the original document,
wherein the photodetector is configured to receive light reflected from the original document in a first reading mode wherein the original document is located on a document platen while the image sensor is moving,
wherein the photodetector is configured to receive light reflected from the original document in a second reading mode wherein the original document is moved and lifted by a spacing from the document platen while the image sensor remains fixed, and
wherein a location of the original document in the first reading mode is at the minimum distance and a location of the original document in the second reading mode is at the maximum distance.

2. The image reading apparatus according to claim 1, further comprising at least one processor configured to perform an edge enhancement correction on information of an image of the original document obtained using the photodetector through a filtering operation that is configured in response to a difference in position between the focal point and a location of the original document.

3. An image reading apparatus comprising:
an image sensor comprising:
a light source; and
a photodetector;
wherein the light source is configured to transmit light to an original document that is located at a plurality of locations different in a direction of a depth of field of the photodetector,
wherein the photodetector is configured receive light reflected from the original document,
wherein the image reading apparatus further comprises a fixing unit comprising a spacer, wherein the fixing unit is configured to adjust a position of the image sensor so that the photodetector is mounted within the image reading apparatus at a position wherein a focal point of the photodetector is located between a minimum distance and a maximum distance from a light incident surface of the photodetector to the original document, and
wherein the fixing unit is configured to adjust the position of the image sensor so that the photodetector is mounted at a position within the image reading apparatus wherein the focal point of the photodetector is located at a location corresponding to half a difference between the minimum distance and the maximum distance.

4. An image reading apparatus, comprising:
an image sensor comprising:
a light source; and
a photodetector;
wherein the light source is configured to transmit light to an original document,
wherein the photodetector is configured receive light reflected from the original document in a first reading mode wherein the original document is stationary and the image sensor is moving,
wherein the photodetector is configured to receive light reflected from the original document in a second reading mode wherein the original document is moving while the image sensor remains fixed; and
wherein the image reading apparatus further comprises a fixing unit comprising a spacer, wherein the fixing unit is configured to adjust a position of the image sensor so that the photodetector is mounted within the image reading apparatus at a position wherein a focal point of the photodetector falls between a first distance from a light incident surface of the photodetector to the original document in the first reading mode and a second distance from the light incident surface of the photodetector to the original document in the second reading mode, and
wherein a location of the original document in the first reading mode is at the first distance and a location of the original document in the second reading mode is at the second distance.

5. An image reading method, comprising:
reading an original document that is located at a plurality of locations different in a direction of a depth of field of a photodetector of an image sensor of an image reading apparatus, the image sensor comprising a light source and the photodetector;
adjusting a position of the image sensor so that the photodetector is mounted at a position within the image reading apparatus wherein a focal point of the photodetector is located between a minimum distance and a maximum distance from a light incident surface of the photodetector to the original document;
receiving, by the photodetector, light reflected from the original document in a first reading mode wherein the original document is located on a document platen while the image sensor is moving; and
receiving, by the photodetector, light reflected from the original document in a second reading mode wherein the original document is moved and lifted by a spacing from the document platen while the image sensor remains fixed,
wherein a location of the original document in the first reading mode is at the minimum distance and a location of the original document in the second reading mode is at the maximum distance.

* * * * *